(12) United States Patent
Lee et al.

(10) Patent No.: US 7,301,730 B2
(45) Date of Patent: Nov. 27, 2007

(54) SUSPENSION WITH STIFFENED END-TAB FOR ACTUATOR IN DATA STORAGE DEVICE

(75) Inventors: Chul-Woo Lee, Seongnam-Si (KR); Ki-Tag Jeong, Gyeonggi-Do (KR); Tae-Soo Kim, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 10/872,303

(22) Filed: Jun. 18, 2004

(65) Prior Publication Data

US 2005/0030671 A1    Feb. 10, 2005

(30) Foreign Application Priority Data

Jun. 20, 2003    (KR) .................... 10-2003-0040105

(51) Int. Cl.
*G11B 5/54* (2006.01)
(52) U.S. Cl. ..................................... 360/255
(58) Field of Classification Search ............. 360/255, 360/244.8, 245, 245.2, 245.4, 246.2
See application file for complete search history.

(56) References Cited

U.S. PATENT DOCUMENTS

| | | | | |
|---|---|---|---|---|
| 5,189,575 | A * | 2/1993 | Onooka et al. | 360/255 |
| 5,585,980 | A * | 12/1996 | Boutaghou | 360/255 |
| 5,781,380 | A * | 7/1998 | Berding et al. | 360/264.2 |
| 6,181,529 | B1 | 1/2001 | Aoyagi et al. | 360/255 |
| 2001/0008475 | A1* | 7/2001 | Takagi et al. | 360/244.8 |
| 2002/0051322 | A1* | 5/2002 | Kashima et al. | 360/245.2 |
| 2002/0114108 | A1* | 8/2002 | Bement et al. | 360/245.4 |

OTHER PUBLICATIONS

Japanese Patent Application No. 09-110600 to Aoyanagi, having filing date of Apr. 28, 1997 (w/ English Abstract page).

* cited by examiner

*Primary Examiner*—Tianjie Chen
(74) *Attorney, Agent, or Firm*—Monica H. Choi

(57) ABSTRACT

An end-tab extends from a suspension for an actuator within a data storage device such as a HDD (hard disk drive). A suspension body supports a read/write head, and the end-tab extends from the suspension body. At least one dimension, such as the width and/or the height, of the end-tab increases from toward a front end of the end-tab to toward the suspension body. Thus, the weight of the end-tab is minimized, and yet the stiffness of the end-tab is enhanced.

16 Claims, 7 Drawing Sheets

SUSPENSION WITH STIFFENED END-TAB FOR ACTUATOR IN DATA STORAGE DEVICE

BACKGROUND OF THE INVENTION

This application claims priority to Korean Patent Application No. 2003-40105, filed on Jun. 20, 2003, in the Korean Intellectual Property Office, the disclosure of which is incorporated herein in its entirety by reference.

1. Field of the Invention

The present invention relates to an actuator for a data storage device such as a HDD (hard disk drive) for example, and more particularly, to a suspension with a stiffened end-tab for the actuator.

2. Description of the Related Art

A hard disk drive (HDD) is a computer data storage device, which reproduces data stored on disks or records data on the disks using read/write heads. In the HDD, the head operates by being moved to a desired position over a disk by an actuator as the head is lifted above the disk by a predetermined height.

When the HDD does not operate (i.e., when the disk is not rotating), the head should be parked in a position other than over any data recording surface of the disk so as not to touch the data recording surface of the disk. Such a head parking system is roughly classified into either a contact start stop (CSS) system or a ramp loading system. In the CSS system, a parking zone is formed for parking the head on an inner peripheral surface of the disk. In the ramp loading system, a ramp is installed outside the disk to park the head on the external ramp.

In the CSS system, since the parking zone is formed on the inner peripheral surface of the disk with no data being recorded on such a parking zone, data storage space is disadvantageously wasted. Thus, for higher data recording density, the ramp loading system is the preferred head parking system since a parking zone on the disk is not used resulting in larger data storage space.

FIG. 1 is a schematic plan view of a HDD using a conventional ramp loading mechanism for the head parking system. FIG. 2 is a perspective view of a ramp and a suspension with a dimple-shaped end-tab in the HDD of FIG. 1. FIG. 3 is a longitudinal sectional view of the suspension with the end-tab of FIG. 2.

Referring to FIGS. 1 through 3, the HDD includes a base plate 10, a spindle motor 12 installed on the base plate 10, one or more disks 20 mounted on the spindle motor 12, and an actuator 30 for moving a slider 34. A read/write head for data reproduction and recording is mounted on the slider 34 that moves the head to a predetermined position on the disks 20.

The actuator 30 includes an actuator pivot 31 installed on the base plate 10, a swing arm 32 rotatably coupled with the actuator pivot 31, a suspension 33 installed at one end of the swing arm 32 for elastically supporting the slider 34 toward a surface of the disks 20, and a voice coil motor (VCM) for rotating the swing arm 32. The VCM includes a VCM coil 39 coupled with the other end of the swing arm 32, a lower yoke 37 disposed under the VCM coil 39, and a magnet 38 attached to a top surface of the lower yoke 37. The VCM may further include an upper yoke (not shown) disposed on the VCM coil 39 and a magnet (not shown) attached to a bottom surface of the upper yoke.

The VCM is controlled by a servo control system and rotates the swing arm 32 in a direction based on Fleming's left-hand rule due to interaction between current input to the VCM coil 39 and a magnetic field formed by the magnet 38. For example, when the HDD is turned on and the disk 20 begins to rotate in an arrow direction D, the VCM rotates the swing arm 32 counterclockwise (in an arrow direction A) to move the slider 34 with the mounted read/write head 35 to a position above a data recording surface of the disk 20. The slider 34 is lifted above the surface of the disk 20 by a predetermined height due to a lift force generated by the rotating disk 20. At this time, the head 35 mounted on the slider 34 reproduces data from or records data on the data recording surface of the disk 20.

In the case when the HDD is not operating with the disk 20 not rotating, the head 35 should be parked in a position that is not any data recording surface of the disk 20 so as not to touch any data recording surface of the disk 20. For this purpose, a ramp 40 is installed outside the disk 20, and the suspension 33 has an end-tab 36 protruding at a distal end of the suspension 33. When the head 35 is parked on the ramp 40, the actuator 30 is locked into a parked position by an actuator latch 50 to prevent unintentional rotation about the pivot 31 from external impact.

Referring to FIGS. 2 and 3, the ramp 40 includes a fixed portion 41 fixedly attached to the base plate 10, and a support 42 extending from the fixed portion 41 toward the disk 20 and overlapping with an outer edge of the disk 20. The support 42 has a support surface 43 for supporting the end-tab 36. An end portion of the support surface 43 disposed toward the disk 20 is inclined such that the end-tab 36 is smoothly loaded and unloaded.

When the HDD is turned off and the disk 20 starts to slow its rotation, the VCM rotates the swing arm 32 clockwise (in an arrow direction B). Accordingly, the end-tab 36 is unloaded from being over the disk 20 and is parked onto the support surface 43 of the ramp 40. Alternatively, when the HDD is turned on and the disk 20 begins to rotate, the end-tab 36 is moved from the support surface 43 of the ramp 40 and is loaded over the disk 20. Such unloading and loading of the end-tab 36 is achieved with the rotation of the swing arm 32 using the VCM as described above.

In the ramp loading mechanism for the head parking system, the end-tab 36 contacts the support surface 43 of the ramp 40 often, resulting in friction between the end-tab 36 and the support surface 43. For minimizing such friction, the conventional end-tab 36 has a hemispherical shape such as a dimple shape for example with a projecting part toward the support surface 43. Such as dimple shape of the end-tab 36 reduces contact area between the end-tab 36 and the support surface 43 of the ramp 40, as illustrated in FIG. 3.

When the end-tab 36 is moved from the disk 20 and then is placed on the support surface 43 of the ramp 40, a large load is applied to the end-tab 36. If the end-tab 36 is not stiff enough to support the load, a portion A illustrated in FIG. 2 of the suspension 33 may be bent. With such bending, the slider 34 attached to the suspension 33 does not separate quickly from the disk 20, and the time for unloading the end-tab 36 is lengthened. As a result, the performance of the HDD disadvantageously deteriorates. Furthermore, repetition of loading and unloading the slider 34 with such bending for a long period of time may damage the end-tab 36.

To prevent the aforementioned problems, it is desirable to enhance the stiffness of the end-tab. For example, the size and thickness of the end-tab may be increased for increasing the stiffness. However, such increase in size and thickness also raises the weight of the end-tab which undesirably decreases the driving performance of the actuator. Accordingly, a small and light end-tab having high stiffness is desired.

FIGS. 4 through 6 illustrate a suspension with a canoe-shaped end-tab suggested to prevent the above problems, as disclosed in U.S. Pat. No. 6,181,529. Referring to FIGS. 4 through 6, an end-tab 62 longitudinally extends from a distal end of a suspension 61. The end-tab 62 has a canoe-shape with a constant width along the length of the end-tab 62. A surface 63 of the end-tab 62 contacting a support surface of a ramp is curved such that a contact area between the end-tab 62 and the support surface of the ramp is minimized. The canoe-shaped end-tab 63 may have a high enough stiffness to be applied for a 2.5-inch disk having a data storage capacity of 40 GB.

With constant demand for higher data recording density, an overlapping area between a support of a ramp and a disk is desired to be decreased to enlarge the data recording surface of the disk. For example, efficient operation for a relatively small 2.5-inch HDD disk within a notebook computer demands further reduction of the overlapping area between the support of the ramp and the disk. For such reduction of the overlapping area, loading and unloading of the end-tab should be more rapidly performed resulting in greater load on the end-tab.

Unfortunately, the canoe-shaped end-tab of the prior art is typically not stiff enough to be applied to a disk having a data storage capacity greater than 40 GB. Therefore, an end-tab is desired to be stiff enough to be applied within a disk drive with such greater data storage capacity.

SUMMARY OF THE INVENTION

Accordingly, end-tabs in embodiments of the present invention have at least one dimension, such as the width and/or the height, that increases from toward a front end of the end-tab to toward the suspension body for increasing stiffness of the end-tabs.

Generally, a suspension for an actuator within a data storage device comprises a suspension body for supporting a read/write head. In addition, an end-tab extends from the suspension body, and at least one dimension of the end-tab increases from toward a front end of the end-tab to toward the suspension body.

In example embodiments of the present invention, the at least one dimension includes at least one of a width and a height of the end-tab.

In another embodiment, the end-tab contacts a support surface of a ramp in a head parking system when the suspension is unloaded. The end-tab is curved out from the support surface of the ramp, and the end-tab contacts the support surface along a longitudinal line from the front end of the end-tab to the suspension body.

In a further embodiment, a width of the end-tab increases from the front end of the end-tab to the suspension body with a constant height from the front end to the suspension body.

In an example embodiment when a width of the end-tab increases from the front end to the suspension body, the end-tab has arc-shaped transverse sections with a radius of arc increasing from the front end to the suspension body.

In another example embodiment, the height of the end-tab increases from the front end to the suspension body. For example, the end-tab has a downward incline from the suspension body to the front end. In such an embodiment, when the end-tab has arc-shaped transverse sections, the radius of arc increases from the front end to the suspension body, or the radius of arc is constant from the front end to the suspension body.

The present invention may be applied to particular advantage when the data storage device is a HDD (hard disk drive).

In this manner, since at least one dimension of the end-tab increases from the front end toward the suspension body, the weight of the end-tab is minimized while at the same time the stiffness of the end-tab is enhanced. Accordingly, the end-tab is light and stiff enough to be used for a disk drive having a data storage capacity in excess of 40 GB from enhanced performance of the actuator. With such a light and stiff end-tab, the life span of the end-tab is prolonged, and the loading and unloading of the end-tab may be more rapid for enhanced performance of the disk drive.

BRIEF DESCRIPTION OF THE DRAWINGS

The above and other features and advantages of the present invention will become more apparent by describing in detail exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, and 15 refer to elements having similar structure and function.

DETAILED DESCRIPTION OF THE INVENTION

Figure 1:
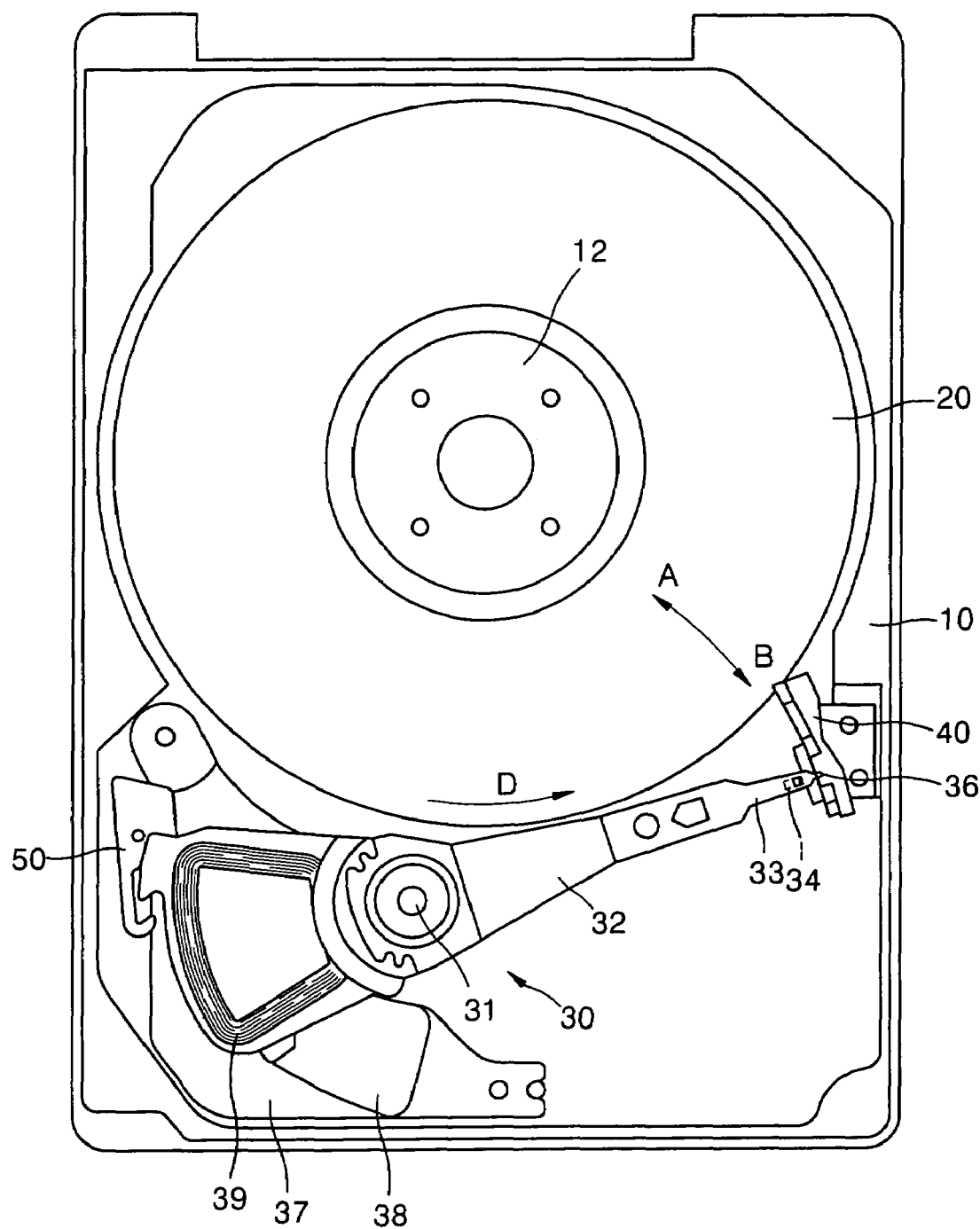
FIG. 1 is a schematic plan view of a hard disk drive (HDD) using a conventional ramp loading mechanism for a head parking system.
Figure 2:
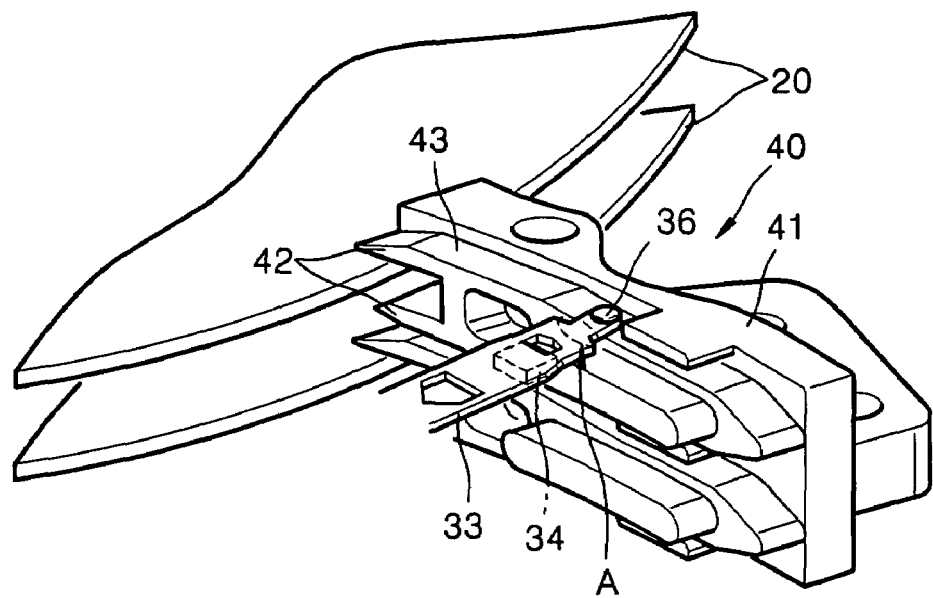
FIG. 2 is a perspective view of a ramp and a suspension with a dimple-shaped end-tab in the HDD of FIG. 1.
Figure 3:
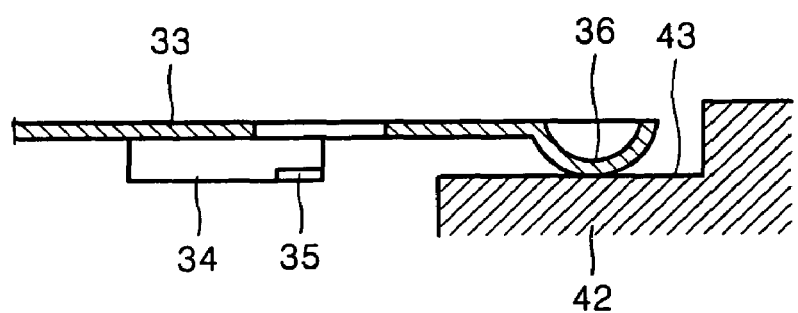
FIG. 3 is a longitudinal sectional view of the suspension with the end-tab of FIG. 2.
Figure 4:
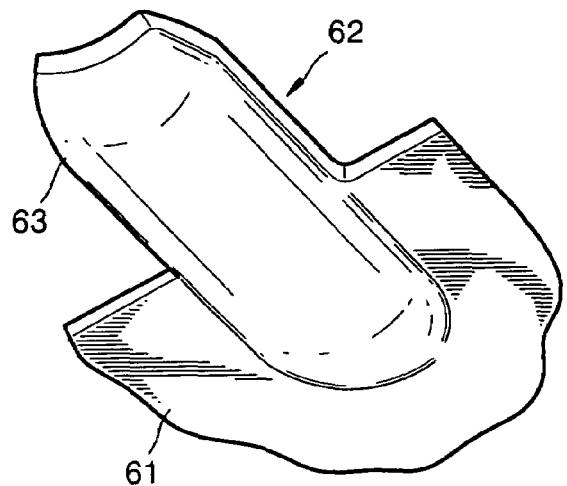
FIG. 4 is a perspective view of a suspension with a conventional canoe-shaped end-tab.
Figure 5:
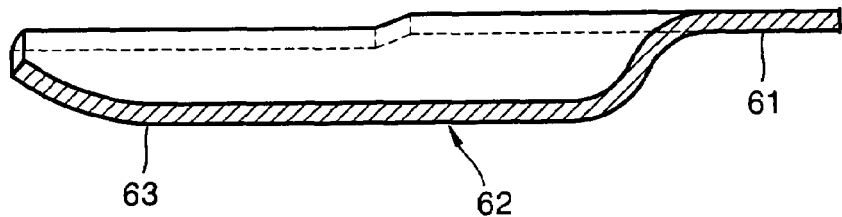
FIG. 5 is a longitudinal sectional view of the suspension with the end-tab of FIG. 4.
Figure 6:
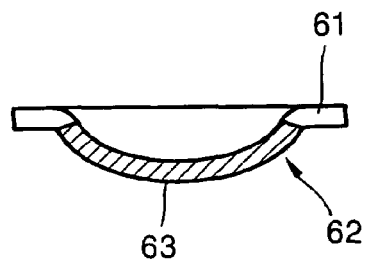
FIG. 6 shows a transverse section of the end-tab of FIG. 4.
Figure 7:
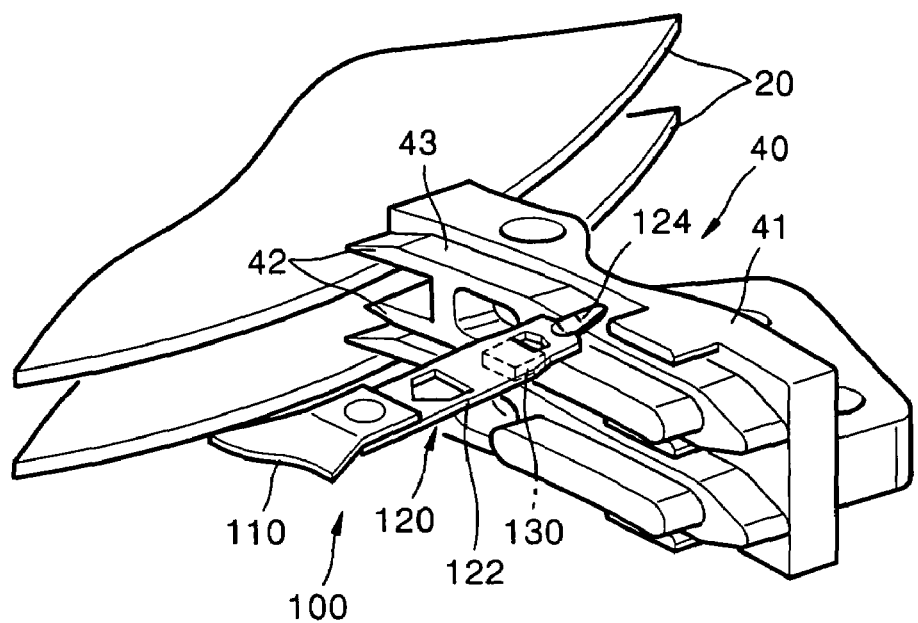
FIG. 7 is a perspective view of a suspension with an end-tab in an actuator according to a first embodiment of the present invention.
Figure 8:
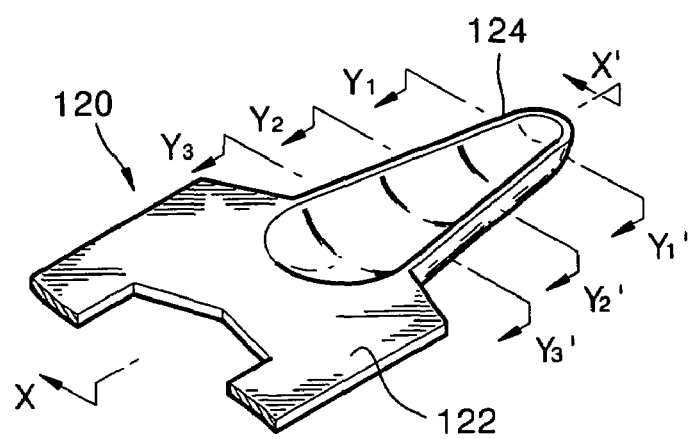
FIG. 8 is an enlarged perspective view of the end-tab of the suspension of FIG. 7.
Figure 9:
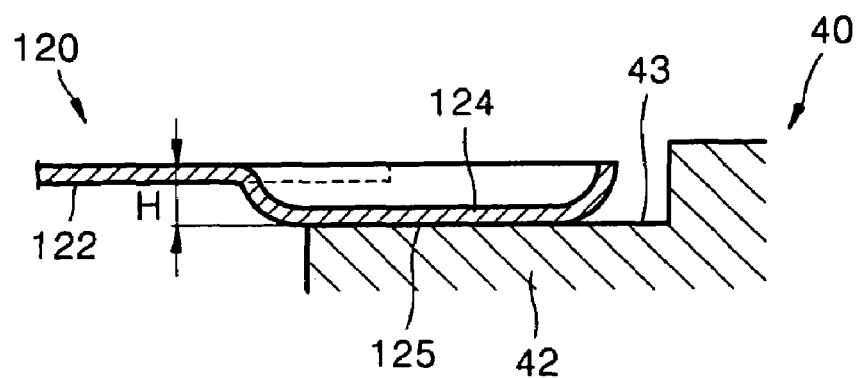
FIG. 9 is a longitudinal sectional view of the suspension body and the end-tab taken along the line X-X' of FIG. 8.
Figure 10:
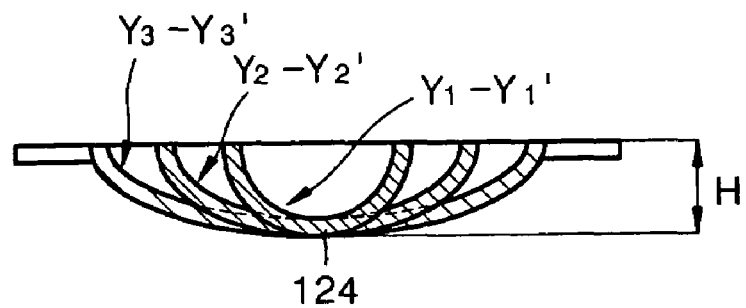
FIG. 10 shows transverse sections of the end-tab along the lines $Y_1$-$Y_1$', $Y_2$-$Y_2$' and $Y_3$-$Y_3$' of FIG. 8.

FIG. 7 is a perspective view of a suspension 120 with an end-tab 124 in an actuator according to a first preferred embodiment of the present invention. FIG. 8 is an enlarged perspective view of the end-tab 124 of FIG. 7. FIG. 9 is a longitudinal sectional view of the suspension body 122 and the end-tab 124 taken along the line X-X' in FIG. 8. FIG. 10 shows transverse sections of the end-tab taken along the lines $Y_1$-$Y_1'$, $Y_2$-$Y_2'$, and $Y_3$-$Y_3'$ in FIG. 8.

Referring to FIG. 7, a suspension 120 having an end-tab 124 is applied within a data storage device, such as a hard disk drive (HDD) using a ramp loading mechanism for a head parking system. As similarly described above for the HDD using the ramp loading mechanism, a ramp 40 is installed outside a disk 20, and an end-tab extending from a distal end of a suspension of an actuator 100 is parked on a support surface 43 of a support 42 of the ramp 40 when the HDD is not operating.

In FIG. 7, the suspension 120 of the actuator 100 supports a slider 130 on which a read/write head is mounted. In addition, referring to FIGS. 7 and 8, the suspension has a suspension body 122, and the end-tab 124 is formed from the suspension body 122 at the distal end of the suspension 120. The distal end of the suspension 120 is the end that is toward the ramp 40 and opposite the end toward a swing arm 110.

The suspension body 122 is made of a metal plate, e.g., a stainless-steel plate. The suspension body 122 is coupled with an end of the swing arm 110 which is rotatably disposed on a base plate of the HDD. The slider 130 on which the read/write head is mounted is attached to a surface of the suspension body 122 facing the disk 20.

The end-tab 124 extends from the distal end of the suspension body 122. In addition, the width of the end-tab 124 starts being narrowest from a front end of the end-tab 124 and continuously increases toward the suspension body 122. The front end of the end-tab 124 is the end that is furthest away from the suspension body 122.

The "width" of the end-tab 124 is defined herein as the dimension along a direction of the end-tab 124 that is perpendicular to a longitudinal direction (line X-X' in FIG. 8). Thus, the "width" of the end-tab 124 is the dimension of the end-tab 124 along a direction of the line $Y_1$-$Y_1'$, $Y_2$-$Y_2'$, or $Y_3$-$Y_3'$ in FIG. 8. The width of the end-tab 124 starts being narrowest from the front end of the end-tab 124 and continuously increases to the suspension body 122, according to one embodiment of the present invention.

In addition, the end-tab 124 curves out in a canoe shape from the support surface 43 of the ramp 40 along the longitudinal direction (line X-X' in FIG. 8). Thus, the canoe shaped end-tab 124 has a convex curved surface facing the support surface 43 of the ramp 40 along the longitudinal direction (line X-X' in FIG. 8).

Referring to FIGS. 8 through 10, the end-tab 124 has a constant height H along the longitudinal direction thereof, and is curved out from the support surface 43 of the ramp 40. Thus, a curved surface 125 of the end-tab 124 is in linear contact with the support surface 43 of the ramp 40 along the longitudinal line X-X' in FIG. 8, thereby minimizing contact area between the end-tab 124 and the support surface 43.

Referring to FIG. 10, the curved end-tab 124 has arc-shaped transverse sections. The radius of arc increases from the front end of the end-tab 124 toward the suspension body 122, as illustrated in FIGS. 8 and 10. Thus in FIGS. 8 and 10, the radius of arc for the section of the end-tab 124 along line $Y_1$-$Y_1'$ (most toward the front end) is lower than the radius of arc for the section of the end-tab 124 along line $Y_2$-$Y_2'$ which is in turn lower than the radius of arc for the section of the end-tab 124 along line $Y_3$-$Y_3'$ (most toward the suspension body 122). However, the height H of the end-tab 124 is constant along the longitudinal direction X-X' as illustrated in FIGS. 9 and 10.

In this manner, since the width of the curved end-tab 124 increases from the front end toward the suspension body 122, the weight of the end-tab 124 is minimized while at the same time the stiffness of the end-tab 124 is enhanced. Accordingly, the end-tab 124 is light and stiff enough to be used for a disk drive having a data storage capacity in excess of 40 GB from enhanced performance of the actuator 100. With such a light and stiff end-tab 124, the life span of the end-tab 124 is prolonged, and the loading and unloading of the end-tab 124 may be more rapid for enhanced performance of the HDD.

Figure 11:
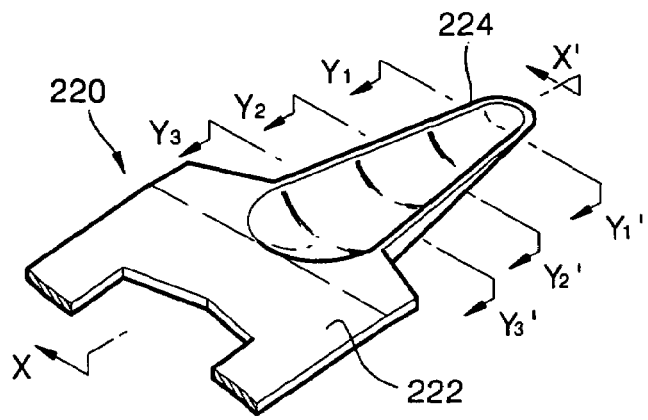
FIG. 11 is a perspective view of a suspension with an end-tab in an actuator according to a second embodiment of the present invention.
Figure 12:
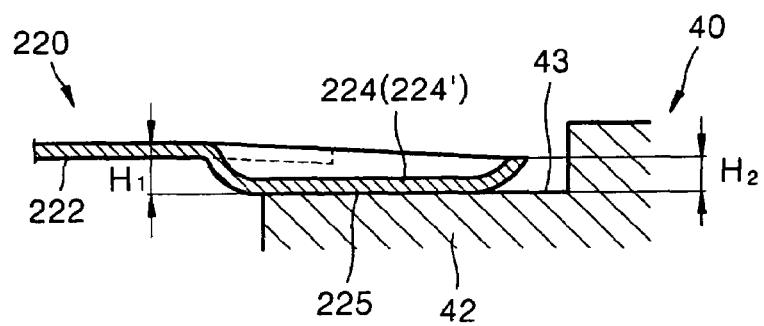
FIG. 12 is a longitudinal sectional view of the suspension body and the end-tab taken along the line X-X' of FIG. 11.
Figure 13:
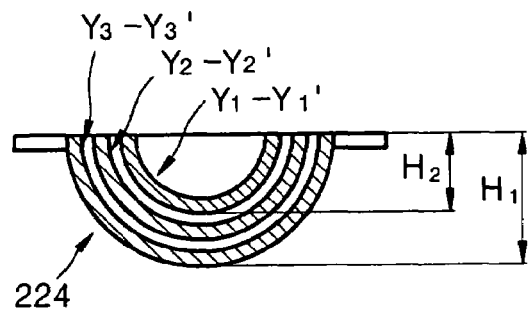
FIG. 13 shows transverse sections of the end-tab taken along the lines $Y_1$-$Y_1$', $Y_2$-$Y_2$' and $Y_3$-$Y_3$' of FIG. 11.

FIG. 11 is a perspective view of a suspension 220 with an end-tab 224 for an actuator according to a second embodiment of the present invention. FIG. 12 is a longitudinal sectional view of the suspension body 220 and the end-tab 224 taken along the line X-X' in FIG. 11. FIG. 13 shows transverse sections of the end-tab taken along the lines $Y_1$-$Y_1'$, $Y_2$-$Y_2'$, and $Y_3$-$Y_3'$ in FIG. 11.

Referring to FIGS. 11, 12, and 13, the suspension 220 of an actuator has a suspension body 222 and the end-tab 224 extending from a distal end of the suspension body 222. The width of the end-tab 224 continuously increases from the front end of the end-tab 224 to the suspension body 222. In addition, the end-tab 224 is curved out from the support surface 43 of the ramp 40 along a longitudinal direction X-X', similar to the end-tab 124 of the first embodiment. Thus, a curved surface 225 of the end-tab 224 is in linear contact with the support surface 43 of the ramp 40, thereby minimizing contact area between the end-tab 224 and the support surface 43.

However, in the end-tab 224 of the second embodiment, the height increases from the front end of the end-tab 222 toward the suspension body 222. Thus, a height $H_1$ of the end-tab 224 adjacent to the suspension body 222 is greater than a height $H_2$ of the front end of the end-tab 224. Therefore, the end-tab 224 is slightly inclined downward toward the support surface 43 of the ramp 40 from the suspension body 22 to the front end of the end-tab 224 as shown in FIG. 12.

The end-tab 224 has arc-shaped transverse sections. A radius of arc becomes larger from the front end of the end-tab 224 toward the suspension body 222. Thus, as shown in FIG. 13, arcs taken along the lines $Y_1$-$Y_1'$, $Y_2$-$Y_2'$, and $Y_3$-$Y_3'$ in FIG. 11 are arranged concentrically.

Figure 14:
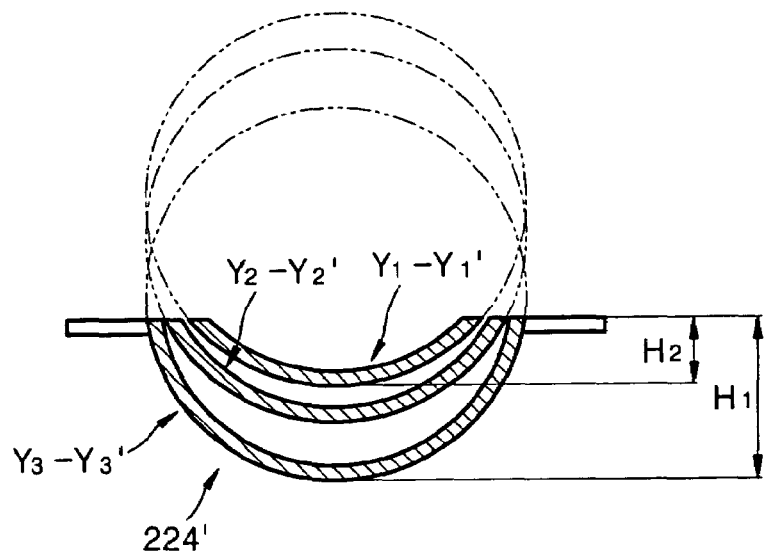
FIG. 14 shows transverse sections illustrating a modified example of the end-tab of FIG. 11.
Figure 15:
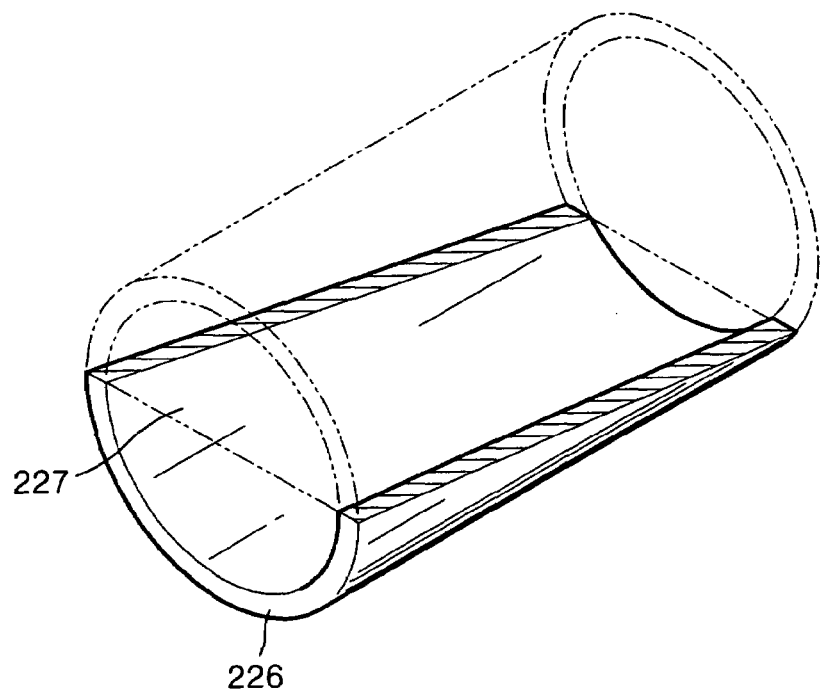
FIG. 15 is a reference view for explaining a shape of the end-tab of FIG. 14.

FIG. 14 shows transverse sections for an end-tab 224' that is modified from the end-tab 224 of FIG. 11. FIG. 15 is a reference view for explaining the shape of the end-tab 224' of FIG. 14.

Referring to FIGS. 12 and 14, the height of the end-tab 224' increases from the front end toward the suspension body 222. The end-tab 224' has arc-shaped transverse sections. A radius of a circle comprising the arcs of the transverse sections is constant from the front end of the end-tab 224' to the suspension body 222, in one embodiment of the present invention.

For example, the end-tab 224', as shown in FIG. 15, has a shape formed by longitudinally cutting a cylinder 226 of constant thickness and radius along a biased cut line 227. In other words, the cylinder 226 is bias cut along the cut line 227 for decreasing the height toward the front end of the end-tab 224' from the suspension body 222, but at the same time, the cut cylinder 226 has a constant sectional radius. The cut line 227 is biased to have a downward incline from the suspension body 222 toward the front end.

The end-tabs 224 and 224' of the second embodiment have similar advantages as the end-tab 124 of the first embodiment. In addition, the height of the end-tabs 224 and 224' of the second embodiment increases from the front end toward the suspension body 222 such that the end-tabs 224 and 224' may be designed to be even lighter and stiffer than the end-tab 124 of the first embodiment.

In addition, the various embodiments of the end-tabs 124, 224, and 224' demonstrate broadly that such end-tabs are stiffened when at least one dimension of the end-tab increases from the front end of the end-tab to the suspension body. In the first embodiment of the end-tab 124 in FIGS. 7, 8, 9, and 10, just the width of the end-tab 124 continuously increases from the front end of the end-tab 124 to the suspension body 122 with the height being constant. In the second and third embodiments of the end-tabs 224 and 224' in FIGS. 11, 12, 13, 14, and 15, both the width and the height of the end-tabs 224 and 224' continuously increase from the front end of the end-tabs 224 and 224' to the suspension body 222. Broadly then, the stiffness of the end-tab is enhanced by increasing at least one dimension, such as the width and/or the height, of the end-tab from the front end of the end-tab toward the suspension body.

In any case with such an end-tab, the weight of the end-tab 124, 224, or 224' is minimized while at the same time the stiffness is enhanced. Accordingly, the end-tab 124, 224, or 224' is light and yet stiff enough to be used for a disk drive having a data storage capacity in excess of 40 GB from enhanced performance of the actuator 100. With such a light and stiff end-tab 124, 224, or 224', the life span of the end-tab is prolonged, and the loading and unloading of such an end-tab may be more rapid for enhanced performance of the disk drive.

The foregoing is by way of example only and is not intended to be limiting. For example, the present invention has been described herein for an actuator within a hard disc drive. However, the present invention may be applied for an actuator in any type of data storage device. In addition, the present invention has been described herein for a ramp loading mechanism for the head parking system. However, the present invention may be applied for any other type of head parking system requiring loading and unloading of the suspension.

In addition, the specific shapes of the end-tab 124, 224, and 224' in FIGS. 8, 9, 10, 11, 12, 13, 14, and 15 are by way of example only, and the present invention may be practiced with other shapes of the end-tab having at least one dimension increasing from toward the front end of the end-tab to toward the suspension body. For example, the width and/or the height is illustrated as continuously increasing from the front-end of the end-tab to the suspension body completely for the whole end-tab in FIGS. 8, 9, 10, 11, 12, 13, 14, and 15. However, the present invention may also be practiced when the width and/or the height increases for a substantial portion or for at least half of the end-tab and not necessarily for the whole end-tab, from toward the front-end of the end tab to toward the suspension body.

Thus, it should be understood by those of ordinary skill in the art that various changes in form and details may be made without departing from the spirit and scope of the present invention as defined by the following claims.

What is claimed is:

1. A suspension for an actuator within a data storage device, the suspension comprising:
   a suspension body for supporting a read/write head; and
   an end-tab extending from the suspension body, wherein a height of the end-tab increases completely for the whole end-tab from a front end of the end-tab to a point of reaching the suspension body.

2. The suspension of claim 1, wherein the end-tab contacts a support surface of a ramp in a head parking system when the suspension is unloaded.

3. The suspension of claim 2, wherein the end-tab is curved out from the support surface of the ramp.

4. The suspension of claim 3, wherein the end-tab contacts the support surface along a longitudinal line from the front end to the suspension body.

5. The suspension of claim 1, wherein a width of the end-tab increases from the front end to the suspension body, and wherein the end-tab has arc-shaped transverse sections with a radius of arc increasing from the front end to the suspension body.

6. The suspension of claim 1, wherein the end-tab has a downward incline from the suspension body to the front end.

7. The suspension of claim 1, wherein the end-tab has arc-shaped transverse sections, and wherein a radius of arc increases from the front end to the suspension body.

8. A suspension for an actuator within a data storage device, the suspension comprising:
   a suspension body for supporting a read/write head; and
   an end-tab extending from the suspension body, wherein at least one dimension of the end-tab increases from toward a front end of the end-tab to toward the suspension body;
   wherein a height of the end-tab increases completely for the whole end-tab from the front end to a point of reaching the suspension body;
   and wherein the end-tab has arc-shaped transverse sections, and wherein a radius of arc is constant from the front end to the suspension body.

9. The suspension of claim 8, wherein the end-tab contacts a support surface of a ramp in a head parking system when the suspension is unloaded.

10. The suspension of claim 9, wherein the end-tab is curved out from the support surface of the ramp.

11. The suspension of claim 10, wherein the end-tab contacts the support surface along a longitudinal line from the front end to the suspension body.

12. The suspension of claim 8, wherein the end-tab has a downward incline from the suspension body to the front end.

13. A data storage device, comprising:
   a disk for storing data; and
   an actuator with a suspension that includes:
      a suspension body for supporting a read/write head; and
      an end-tab extending from the suspension body, wherein a height of the end-tab increases completely for the whole end-tab from a front end of the end-tab to a point of reaching the suspension body.

14. The data storage device of claim 13, further comprising:
   a head parking system having a ramp with the end-tab contacting a support surface of the ramp when the suspension is unloaded.

15. The data storage device of claim 14, wherein the end-tab is curved out from the support surface of the ramp.

16. The data storage device of claim 13, wherein a width of the end-tab increases from the front end to the suspension body, and wherein the end-tab has arc-shaped transverse sections with a radius of arc increasing from the front end to the suspension body.

* * * * *